United States Patent [19]

Yamamoto

[11] 4,287,678

[45] Sep. 8, 1981

[54] FISHING ROD LINE GUIDE

[75] Inventor: Shigeru Yamamoto, Higashikurume, Japan

[73] Assignee: Daiwa Seiko, Inc., Higashikurume, Japan

[21] Appl. No.: 143,233

[22] Filed: Apr. 24, 1980

Related U.S. Application Data

[62] Division of Ser. No. 946,278, Sep. 27, 1978, abandoned.

[51] Int. Cl.³ .............................................. A01K 87/04
[52] U.S. Cl. .................................. 43/24; 242/157 R; 264/262; 264/267
[58] Field of Search ..................... 264/262, 267; 43/24; 242/157

[56] References Cited

U.S. PATENT DOCUMENTS 2,689,755  9/1954  Krotz .................................. 264/262
4,011,680  3/1977  Rienzo .................................... 43/24

FOREIGN PATENT DOCUMENTS 321879  10/1934  Italy ..................................... 264/262

*Primary Examiner*—James H. Derrington
*Attorney, Agent, or Firm*—Sughrue, Mion, Zinn, Macpeak & Seas

[57] ABSTRACT

An outer ring frame and an inner ring frame are separately prepared and disposed coaxially in a mold die with an annular space therebetween and a synthetic resin is injected into the annular space.

1 Claim, 4 Drawing Figures

FISHING ROD LINE GUIDE

This is a division of application Ser. No. 946,278, filed Sept. 27, 1978, now abandoned.

BACKGROUND OF THE INVENTION

It is known that a number of line guides are mounted on and along a fishing rod to smoothen a fishing line guiding and, therefore, each line guide should be as light in weight as possible, otherwise the load distribution along the fishing rod becomes much different from that of the original rod.

Known in the art is a line guide whose annular ring is of a metal such as stainless steel or a ceramic. The solid metal line guide is, however, heavy in weight and the ceramic guide is poor in durability in addition to the weight problem. Particularly, when the size of the line guide is large, the use of a number of the line guides affects the fishing rod adversely, making it unbalanced and the handling thereof uncomfortable.

Further, known in the art is a line guide composed of a ceramic ring, an outer support ring frame of metal and an annular cushion member disposed between the outer side of the ceramic ring and the inner side of the outer support ring (Japanese Utility Model Publication No. 4082/1965). Although this line guide provides some improvement on the durability with respect to the line guide without the cushion member, there is still a strong probability of cracking of the ceramic ring due to impact forces. In order to avoid the cracking of the ceramic ring, the thickness of the ceramic ring must be increased, causing an increase in weight thereof. In addition to this defect, since, in assembling the line guide, the ceramic ring must be pushed into the cushion member held in the outer support, the assembling operation is troublesome and if a pressure higher than a predetermined value is applied thereto or the temperature changes, the ceramic ring itself might be broken.

SUMMARY OF THE INVENTION

An object of the present invention is to provide a method of producing a line guide for fishing rod, which is light in weight and capable of withstanding shocks.

In the present method, an outer annular metal ring and an inner annular metal ring are previously prepared, independently.

The outer metal ring may be provided with a mounting member welded to an outer surface thereof by which the outer annular metal member is mounted on a fishing rod.

The inner and outer metal rings are disposed in an injection mold (die) such that the inner metal member is arranged coaxially with the outer metal member with an annular space therebetween. A synthetic resin is injected into the annular space, resulting in a line guide comprising the inner metal ring supported by the synthetic resin ring held by the outer metal ring. The line guide produced according to the present method is substantially free from damages due to shocks and, particularly, since the line guiding portion of the line guide, i.e., the inner ring is of metal, there is no problem of such as cracking which might occur frequently in the case of the line guide having a ceramic line guiding portion. Further, since the annular space between the inner metal ring and the outer metal ring can be arbitrarily selected by changing the diameter of either the inner ring or the outer ring, it is possible to thin the synthetic resin ring. This, together with a selection of light weight resin, attributes to a decrease of the weight of the line guide, resulting in a prevention of unbalance of the whole rod when a plurality of such line guides as above are mounted thereon.

With the guide line in which the inner metal ring and the outer metal ring are assembled with the aid of the synthetic resin injected, there is no case of the removal of the inner member from the synthetic resin ring and hence the outer ring due to the temperature change and/or mechanical shocks during the use thereof, making the line guide durable and reliable.

DETAILED DESCRIPTION OF THE PREFERRED EMBODIMENTS

Figure 1:
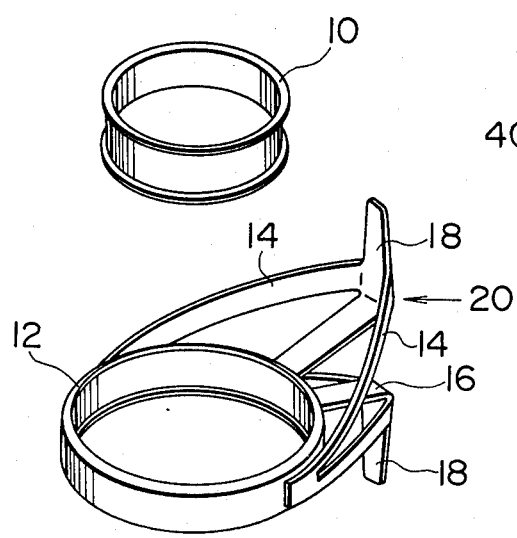
FIG. 1 is a perspective view showing an annular inner metal ring and an annular outer metal ring having a support or mounting member fixedly secured thereto, in a disassembled state.

In FIG. 1, an inner annular ring 10 having a concave outer wall portion and an outer annular ring 12 having a concave inner wall portion are previously prepared from a metal such as, for example, stainless steel or brass.

A metal mounting and supporting member 20 which includes a mounting portion 18 adapted to be mounted on a fishing rod, a center support portion 16 and a pair of side support portions 14, all of which may be formed by pressing of a metal sheet, is also prepared previously. The outer wall portion of the outer ring 12 is suitably welded to the center support portion 16 and the side support portions 14 to form a three point support.

Figure 3:
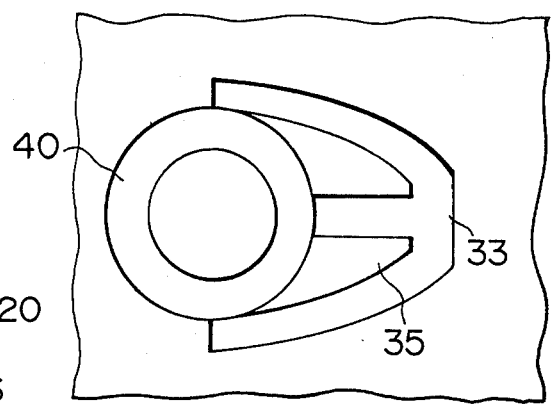
FIG. 3 is a plan view of the lower mold half.
Figure 2:
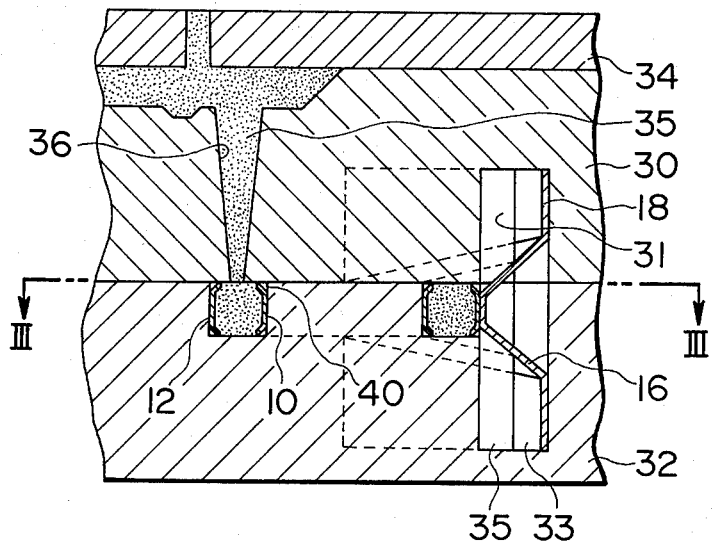
FIG. 2 is a cross section of the line guide held in a mold, showing an injection state according to the present invention.

FIG. 2 shows a cross section of the inner ring 10 and the outer ring 12 having the mounting and supporting member 20 welded thereto disposed in an injection mold. The injection mold is composed of an upper mold half 30, a lower mold half 32 and a cover member 34. The lower mold half 32 is formed on an inner surface thereof with an annular groove 40 and a recess 33. FIG. 3 shows a plan view of the lower mold half 32. The annular groove 40 is adapted to tightly receive the inner ring 10 and the outer ring 12 with a suitable space therebetween. The recess 33 is adapted to receive a portion of the mounting and supporting member 20 welded to the outer ring 12. When the metal mounting and supporting member 20 is unnecessary, the recess 33 may be omitted.

The upper mold half 30 is formed in an inner surface thereof a recess 31 to receive the remaining portion of the member 20 when the upper and lower mold halves 30 and 32 are assembled. The upper mold half 30 is further formed with a tapered through-hole 36 the lower end of which is opened to the space between the inner and the outer rings 10 and 12 received in the groove 40 of the lower mold half 32 in the assembled state.

A suitable thermoplastic or thermosetting resin 35 such as polyamide resin, polyacetate resin, ABS, phenol resin etc. is injected through the through-hole 35 into the space between the inner and the outer rings 10 and 12. Since the space is annular, the injected resin fills the space completely.

Figure 4:
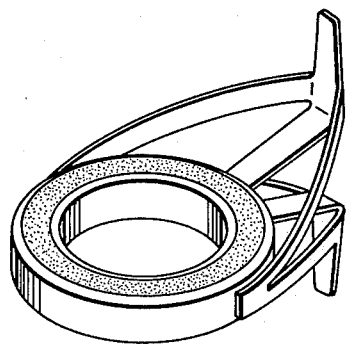
FIG. 4 is a perspective view of a line guide produced according to the present invention.

FIG. 4 is a perspective view of a line guide produced according to the present method.

The line guide produced according to the present invention is substantially free from damages due to shocks, and is light in weight in comparison with the conventional metal guide or ceramic guide. Therefore, the fishing balance of a fishing rod is substantially not influenced adversely by the line guides mounted therealong.

The thickness of the line guide is arbitrarily selected by selecting the width of the space between the inner annular member 10 and the outer annular member 12 as mentioned previously. Further, the present line guide is completely free from the droppingout of the inner ring which may frequently occur in the line guide having ceramic ring due to a temperature variation and/or mechanical shocks.

Since the inner ring and the outer ring of the present line guide are of metal, the sizes thereof can be easily prepared with high precision, it is easy to dispose them in the injection mold, causing the molding to be very easy, by which a mass production thereof is facilitated. Due to the employment of the synthetic resin, the colouring thereof is also easy.

What is claimed is:

1. A fishing rod line guide comprising:
   (a) an inner ring;
   (b) an outer ring having a diameter larger than the diameter of the inner ring and disposed concentrically about said inner ring to thereby define an annular space between said inner and outer rings;
   (c) a synthetic resin material molded into said annular space between said rings;
   (d) the outer surface of said inner ring and the inner surface of said outer ring having concave contours wherein said combination of said inner and outer rings and synthetic resin material molded therebetween prevents said inner ring from slipping out of said outer ring, said combination forming a lightweight shock resistant fishing line guide structure.

* * * * *